United States Patent [19]
Greenwalt

[11] Patent Number: 5,397,376
[45] Date of Patent: * Mar. 14, 1995

[54] METHOD OF PROVIDING FUEL FOR AN IRON MAKING PROCESS

[75] Inventor: Richard B. Greenwalt, Danville, Calif.

[73] Assignee: Bechtel Group, Inc., San Francisco, Calif.

[*] Notice: The portion of the term of this patent subsequent to Nov. 9, 2010 has been disclaimed.

[21] Appl. No.: 84,888

[22] Filed: Jun. 30, 1993

Related U.S. Application Data

[63] Continuation-in-part of Ser. No. 958,043, Oct. 6, 1992, Pat. No. 5,259,864, and a continuation-in-part of Ser. No. 991,914, Dec. 17, 1992, and a continuation-in-part of Ser. No. 56,341, Apr. 30, 1993, Pat. No. 5,259,865.

[51] Int. Cl.⁶ ............................................. C21B 13/14
[52] U.S. Cl. ............................................ 75/445; 75/492; 75/958
[58] Field of Search ....................... 75/445, 492, 958

[56] References Cited

U.S. PATENT DOCUMENTS

| | | | |
|---|---|---|---|
| 3,850,615 | 11/1974 | Reeves | 75/26 |
| 4,070,181 | 1/1978 | Widell | 75/91 |
| 4,073,642 | 2/1978 | Collin et al. | 75/35 |
| 4,317,677 | 3/1982 | Weber et al. | 75/43 |
| 4,389,043 | 6/1983 | Weber et al. | 266/218 |
| 4,396,421 | 8/1983 | Stift et al. | 75/11 |
| 4,409,023 | 10/1983 | Weber et al. | 75/38 |
| 4,448,402 | 5/1984 | Weber et al. | 266/183 |
| 4,542,889 | 9/1985 | Vuletic | 266/137 |
| 4,543,123 | 9/1985 | Vuletic | 75/34 |
| 4,588,437 | 5/1986 | Kepplinger et al. | 75/43 |
| 4,605,205 | 8/1986 | Langner et al. | 266/160 |
| 4,673,432 | 6/1987 | Hauk | 75/38 |
| 4,708,736 | 11/1987 | Hauk et al. | 75/26 |
| 4,725,308 | 2/1988 | Kepplinger | 75/26 |
| 4,728,360 | 3/1988 | Hauk et al. | 75/26 |
| 4,755,219 | 7/1988 | Hauk | 75/10.22 |
| 4,784,689 | 11/1988 | Vuletic | 75/38 |
| 4,793,855 | 12/1988 | Hauk | 75/26 |
| 4,793,857 | 12/1988 | Vuletic | 75/34 |
| 4,805,880 | 2/1989 | Hauk et al. | 266/87 |
| 4,806,154 | 2/1989 | Hauk | 75/10.19 |
| 4,806,158 | 2/1989 | Hirsch et al. | 75/26 |
| 4,822,411 | 4/1989 | Standler et al. | 75/35 |
| 4,846,449 | 7/1989 | Hauk et al. | 266/172 |
| 4,849,015 | 7/1989 | Fassbinder et al. | 75/26 |
| 4,850,574 | 7/1989 | Vuletic | 266/146 |
| 4,854,967 | 8/1989 | Hauk | 75/34 |
| 4,857,284 | 8/1989 | Hauk | 423/231 |
| 4,865,626 | 9/1989 | Papst et al. | 48/210 |
| 4,874,427 | 10/1989 | Hamada et al. | 75/26 |

(List continued on next page.)

FOREIGN PATENT DOCUMENTS

0468950A2 1/1991 European Pat. Off.

OTHER PUBLICATIONS

Fleichtner, Hanns et al. "The Corex Process" *Skillings' Mining Review*, Jan. 14, 1989, pp. 20-27.

*Primary Examiner*—Melvyn J. Andrews

[57] ABSTRACT

The invention provides a method for both disposing of an environmentally undesirable material comprising petroleum coke and the sulfur and heavy metals contained therein and of providing fuel for a process of making molten iron or steel preproducts and reduction gas in a melter gasifier having an upper fuel charging end, a reduction gas discharging end, a lower molten metal and slag collection end, and means providing an entry for charging ferrous material into the melter gasifier; introducing petroleum coke into the melter gasifier at the upper fuel charging end; blowing oxygen-containing gas into the petroleum coke to form at least a first fluidized bed of coke particles from the petroleum coke; introducing ferrous material into the melter gasifier through the entry means, reacting petroleum coke, oxygen and particulate ferrous material to combust the major portion of the petroleum coke to produce reduction gas and molten iron or steel preproducts containing heavy metals freed from combustion of the petroleum coke and a slag containing sulfur freed from combustion of the petroleum coke.

39 Claims, 3 Drawing Sheets

U.S. PATENT DOCUMENTS

| | | | |
|---|---|---|---|
| 4,878,943 | 11/1989 | Kepplinger | 75/25 |
| 4,889,323 | 12/1989 | Pusch et al. | 266/142 |
| 4,891,062 | 1/1990 | Vuletic et al. | 75/28 |
| 4,895,593 | 1/1990 | Sulzbacher et al. | 75/26 |
| 4,897,179 | 1/1990 | Mori et al. | 208/127 |
| 4,898,366 | 2/1990 | Vuletic | 266/160 |
| 4,913,733 | 4/1990 | Hauk | 75/491 |
| 4,946,498 | 8/1990 | Weber | 75/26 |
| 4,955,587 | 9/1990 | Sulzbacher et al. | 266/156 |
| 4,957,545 | 9/1990 | Hikosaka et al. | 75/501 |
| 4,958,808 | 9/1990 | Hauk | 266/154 |
| 4,978,387 | 12/1990 | Kepplinger | 75/445 |
| 4,989,366 | 2/1991 | DeVlieger | 47/57.5 |
| 5,043,011 | 8/1991 | Hauk | 75/446 |
| 5,259,864 | 11/1993 | Greenwalt | 75/445 |
| 5,259,865 | 11/1993 | Greenwalt | 75/445 |

METHOD OF PROVIDING FUEL FOR AN IRON MAKING PROCESS

This application is a continuation-in-part of application Ser. No. 07/958,043, filed Oct. 6, 1992, Ser. No. 07/991,914, filed Dec. 17, 1992, and Ser. No. 08/056,341, filed Apr. 30, 1993.

BACKGROUND OF THE INVENTION

The invention relates to a method of both disposing of an environmentally undesirable material, namely petroleum coke and the sulfur and heavy metals contained therein, and of providing fuel for a process of making molten iron or steel preproducts and reduction gas in a melter gasifier.

Petroleum coke is a product of refinery operations and is produced in the United States utilizing three types of coke processing technology. Specifically these technologies as known to one skilled in the art are delayed, fluid and flexi. By far most petroleum coke in the United States is produced using delayed technology. In 1990, according to the U.S. Department of Energy, 55 refineries in the United States which had coking facilities and a refinery capacity of 8 million barrels per day produced slightly over 76,000 short tons per day of petroleum coke. The residual petroleum coke produced amounted to about 6% by weight of each barrel of crude oil processed by the refineries.

Petroleum coke is generally the bottom end of refinery operations after most of the light ends and oils have been recovered from the original crude. The make up of petroleum coke will vary depending on a number of factors including the crude being processed and the process being utilized. Generally on a dry basis petroleum coke will be composed largely (approximately 90%) of fixed carbon and typically include sulfur (0.05% to 6%) and nitrogen (2% to 4%). Various metals typically including vanadium, iron and nickel are found in petroleum coke. Usually, a typical petroleum coke contains about 10% volatile matter. Petroleum coke contains up to 10 to 15% moisture before drying.

Petroleum coke is produced either as blocky sponge coke or needle coke from delayed cokers or in a shot size form from fluid bed cokers. Sponge coke from delayed cokers is by far the most important coke produced in the United States. Calcined sponge coke is used primarily in the manufacture of graphite electrodes, anodes and shaped products. Approximately one-third of the sponge coke production is used in these products.

Until recent years the remainder of the petroleum coke in the U.S. was used as fuel for power plants and cement kilns. However due to the high sulfur content, the need for blending with coal to maintain ignition and flame stability and environmental problems, petroleum coke has become less suitable as a boiler fuel. The high sulfur content of petroleum coke also poses problems for cement kilns. Excess sulfur will cause finished concrete to expand and crack and also influences setting time. The high vanadium content also poses problems. Thus there is a substantial amount of excess petroleum coke which must be disposed. The high sulfur content and the relatively high amounts of metals such as vanadium and nickel make such disposal a real environmental problem which the present invention is directed to solving.

U.S. Pat. No. 4,849,015 to Fassbinder et al. discloses a method for two-stage melt reduction of iron ore, in which iron ore is prereduced substantially to wustite and at the same time melted down in a melting cyclone, and then liquid hot metal is produced in an iron bath reactor connected to the outlet of the melting cyclone and receiving the melted wustite by adding carbonaceous fuels and oxidizing gas to the melt. The resulting reaction gas from the melt is afterburned, and the dust-laden, partly burned reaction gases from the iron bath reactor are accelerated and further afterburned by adding a hot blast with a temperature of 800° C. to 1500° C., and at least a portion of such accelerated, after burned reaction gases are introduced into the melting cyclone to reduce and melt fresh iron ore.

Carbonaceous fuels, such as coke, carbonized lignite, petroleum coke, etc., but preferably coal of varying quality, are fed to the melt in the iron bath reactor. Slag-forming additives, such as lime, fluorspar, etc., are also fed to the iron melt to set the desired slag composition. Although it is irrelevant for the present invention whether these substances are introduced into the melt on the bath surface or from below the bath surface, it is preferable to add them through underbath feed nozzles.

U.S. Pat. No. 4,806,158 to Hirsch et al. discloses a process for the production of reduced iron oxide-containing materials. Iron oxide and solid carbonaceous reducing agent are charged into a first expanded fluidized bed, which is supplied with an oxygen-containing fluidizing gas. The gas residence time selected is controlled in the reactor containing the first fluidized bed so that the reduction potential will result in a reduction of the iron oxide material not in excess of the FeO stage. A gas-solids suspension discharged from the first fluidized bed is supplied to a second expanded fluidized bed, which is supplied with a strongly reducing fluidizing gas. Strongly reducing gas and a major portion of the resulting devolatilized carbonaceous material are discharged from the upper portion of the second fluidized bed. Reduced material having a metallization of 50 to 80% and the remaining devolatilized carbonaceous material are discharged from the lower portion of the second fluidized bed. Suitable carbonaceous materials include all coals, from anthracite to lignite, carbonaceous minerals and waste products, such as oil shale, petroleum coke or washery refuse, provided that they are solid at room temperature. The oxygen-containing gas preferably consists of oxygen or of oxygen-enriched air.

U.S. Pat. No. 4,897,179 to Mori et al. provides a method of producing reduced iron and light oil from iron ore and heavy oil which comprises a thermal cracking step of subjecting heavy oil to thermal cracking while retaining iron ore particles in a fluidized state to produce light oil and simultaneously to deposit coke as by-product on the surface of the iron ore particles; a gasification step of putting the coke-deposited ore in contact with an oxidizing gas including steam and oxygen in a fluidized state to react the coke with the gas thereby to produce a reducing gas containing hydrogen and carbon monoxide and of heating the coke-deposited ore upward of a reduction temperature of iron ore by partial oxidization of the coke; and a reduction step of reducing the coke-deposited iron ore in a fluidized state by the reducing gas to produce reduced iron. When the gasification step is performed by an oxidizing gas containing a majority of steam and up to 15 vol. %, based on the steam, of oxygen at 800°–1000° C. under a pressure of 0–10 kg/cm$^2$G, a reducing gas containing high-concentration hydrogen gas is obtained.

Slags of high sulfur capacity have been utilized in applications associated with ferrous metallurgy. Kleimeyer et al. in U.S. Pat. No. 4,600,434 describe the use of high sulfur capacity slag and magnesium metal to desulfurize molten iron while it is contained in a torpedo car. Quigley, U.S. Pat. No. 4,853,034, describes using a vanadium-bearing, high-magnesia synthetic calcium aluminate slag for absorbing sulfur during ladle refining of steel. Knauss et al., U.S. Pat. No. 4,695,318, describe using a synthetic slag similar to that of U.S. Pat. No. 4,853,034, and the refractory brick of the ladle itself, to desulfurize molten iron contained in said ladle.

In recent years methods utilizing a melter gasifier have been developed to produce molten iron or steel preproducts and reduction gas. Most of these processes utilize a coal fluidized-bed. A high temperature is produced in the melter gasifier utilizing coal and blown in oxygen to produce a fluidized bed and iron sponge particles are added from above to react in the bed to produce the molten iron.

Thus in European Patent B1-0010627, a coal fluidized-bed with a high-temperature zone in the lower region is produced in a melter gasifier, to which iron sponge particles are added from above. On account of the impact pressure and buoyancy forces in the coal fluidized-bed, iron sponge particles having sizes greater than 3 mm are considerably braked and substantially elevated in temperature by the heat exchange with the fluidized bed. They impinge on the slag layer forming immediately below the high-temperature zone at a reduced speed and are melted on or in the same. The maximum melting performance of the melter gasifier, and thus the amount and temperature of the molten iron produced, not only depends on the geometric dimensions of the melter gasifier, but also are determined to a large extent by the quality of the coal used and by the portion of larger particles in the iron sponge added. When using low-grade coal, the heat supply to the slag bath, and thus the melting performance for the iron sponge particles, decline accordingly. In particular, with a large portion of iron sponge particles having grain sizes of about 3 mm, which cannot be heated to the same extent as smaller particles by the coal fluidized-bed when braked in their fall and which, therefore, necessitate a higher melting performance in the region of the slag layer, the reduced melting performance has adverse effects in case low-grade coal is used.

A melter gasifier is an advantageous method for producing molten iron or steel preproducts and reduction gas are described in U.S. Pat. No. 4,588,437. Thus there is disclosed a method and a melter gasifier for producing molten iron or steel preproducts and reduction gas. A first fluidized-bed zone is formed by coke particles, with a heavy motion of the particles, above a first blow-in plane by the addition of coal and by blowing in oxygen-containing gas. Iron sponge particles and/or pre-reduced iron ore particles with a substantial portion of particle sizes of more than 3 mm are added to the first fluidized-bed zone from above. A melter gasifier for carrying out the method is formed by a refractorily lined vessel having openings for the addition of coal and ferrous material, openings for the emergence of the reduction gases produced, and openings for tapping the metal melt and the slag. Pipes or nozzles for injection of gases including oxygen enter into the melter gasifier above the slag level at at least two different heights.

Another process utilizing a melter gasifier is described in U.S. Pat. No. 4,725,308. Thus there is disclosed a process for the production of molten iron or of steel preproducts from particulate ferrous material as well as for the production of reduction gas in the melter gasifier. A fluidized-bed zone is formed by coke particles upon the addition of coal and by blowing in oxygen-containing gas by nozzle pipes penetrating the wall of the melter gasifier. The ferrous material to be reduced is introduced into the fluidized bed. In order to be able to produce molten iron and liquid steel preproducts in a direct reduction process with a lower sulfur content of the coal used, the ferrous material to be reduced is supplied closely above the blow-in gas nozzle plane producing the fluidized bed. An arrangement for carrying out the process includes a melter gasifier in which charging pipes penetrating its wall are provided in the region of the fluidized-bed zone closely above the plane formed by the nozzle pipes. The ferrous material to be melted as well as the dusts separated from the reduction gas and, if desired, fluxes containing calcium oxide, magnesium oxide, calcium carbonate and/or magnesium carbonate are introduced therethrough.

There is also a process known as the COREX® process (COREX® is a trademark of Deutsche Voest-Alpine Industrieanlagenbau GMBH and Voest-Alpine Industrieanlagenbau). This process is described in *Skilling's Mining Review*, Jan. 14, 1989 on pages 20–27. In the COREX® process the metallurgical work is carried out in two process reactors: the reduction furnace and the melter gasifier. Using non-coking coals and iron bearing materials such as lump ore, pellets or sinter, hot metal is produced with blast furnace quality. Passing through a pressure lock system, coal enters the dome of the melter gasifier where destructive distillation of the coal takes place at temperatures in the range of 1,100°–1,150° C. Oxygen blown into the melter gasifier produces a coke bed from the introduced coal and results in a reduction gas consisting of 95% CO + $H_2$ and approximately 2% $CO_2$. This gas exits the melter gasifier and is dedusted and cooled to the desired reduction temperature between 800 and 850° C. The gas is then used to reduce lump ores, pellets or sinter in the reduction furnace to sponge iron having an average degree of metalization above 90% The sponge iron is extracted from the reduction furnace using a specially designed screw conveyor and drops into the melter gasifier where it melts to the hot metal. As in the blast furnace, limestone adjusts the basicity of the slag to ensure sulfur removal from the hot metal. Depending on the iron ores used, $SiO_2$ may also be charged into the system to adjust the chemical composition and viscosity of the slag. Tapping procedure and temperature as well as the hot metal composition are otherwise exactly the same as in a blast furnace. The top gas of the reduction furnace has a net calorific value of about 7,000 KJ/Nm$^3$ and can be used for a wide variety of purposes.

The fuels used in these processes are typically described as a wide variety of coals and are not limited to a small range of coking coal. The above-noted article from *Skilling's Mining Review* notes that petroleum coke suits the requirements of the COREX® process. Brown coal and steam coal which are relatively poor quality coal having a relatively high ash content i.e. plus 15%, have been identified as suitable for use in these processes. Coke made from coal has also been identified as a fuel for many of the processes utilizing melter gasifiers.

SUMMARY OF THE INVENTION

The present invention is directed to a solution for the disposal of an environmentally objectionable material and provision of a new and unexpectedly superior fuel source for processes utilizing melter gasifiers to make molten iron or steel preproducts.

In accordance with the invention it has been found that petroleum coke makes an excellent source of carbon in processes making molten iron or steel preproducts in which a melter gasifier unit is used. Moreover, the reaction in these processes utilizing the petroleum coke as a fuel in the melter gasifier tend to combust the petroleum coke substantially completely with reduction gas as the only gaseous product. Most residual sulfur is carried as a sulfide over with the slag formed in the melter gasifier and can be removed and disposed of with the slag. Heavy metals are carried over in stable form in solution in the molten iron or steel preproducts and will solidify therewith.

In a broad aspect, the invention provides a method for both disposing of an environmentally undesirable material which is difficult and expensive to dispose of namely petroleum coke and the sulfur and heavy metals contained therein and of providing fuel for a process of making molten iron or steel preproducts and reduction gas in a melter gasifier. A melter gasifier is used in the invention and has an upper fuel charging end and a reduction gas discharging end and a lower molten metal and a slag collection end. Entry means are provided into the melter gasifier for charging ferrous material usually in particulate form into the melter gasifier. Petroleum coke usually in particulate form is introduced into the melter gasifier at the upper fuel charging end. Oxygen-containing gas is blown into the petroleum coke in the melter gasifier to form at least a first fluidized bed of coke particles formed by combustion of petroleum coke. Particulate ferrous material is introduced into the melter gasifier through the entry means. Petroleum coke, oxygen and particulate ferrous material are reacted to combust the major portion of the petroleum coke. Reduction gas and molten iron or steel preproducts are produced and a slag is formed which will contain sulfur freed by combustion of the petroleum coke. Heavy metals from the petroleum coke are carried over in stable form and go into solution in the molten iron or steel preproducts. The slag and the sulfur contained therein are removed from the melter gasifier for disposal.

OBJECT OF THE INVENTION

It is a particular object of the present invention to provide a process for both disposing of an environmentally undesirable material and providing a novel fuel for an iron making process which utilizes a melter gasifier. Other objects and advantages of the present invention will be apparent from the following detailed description read in view of the accompanying drawings which are made a part of this specification.

DESCRIPTION OF THE PREFERRED EMBODIMENT

The invention is predicated on the recognition that petroleum coke can advantageously replace coal or coke made from coal which heretofore was used as a source of carbon in iron making processes wherein a melter gasifier is used. In most such applications petroleum coke will be the superior fuel as opposed to coal for reasons more fully set out herein. In addition, the use of petroleum coke in the iron making process in a melter gasifier substantially completely combusts the petroleum coke thus solving an environmentally sensitive disposal problem. Sulfur and heavy metals which are contained in petroleum coke are also safely disposed of in accordance with the invention. While petroleum coke has been burned in heater and boiler applications, it, so far as is known, has never been used in iron making processes in which a melter gasifier is used.

Figure 1:
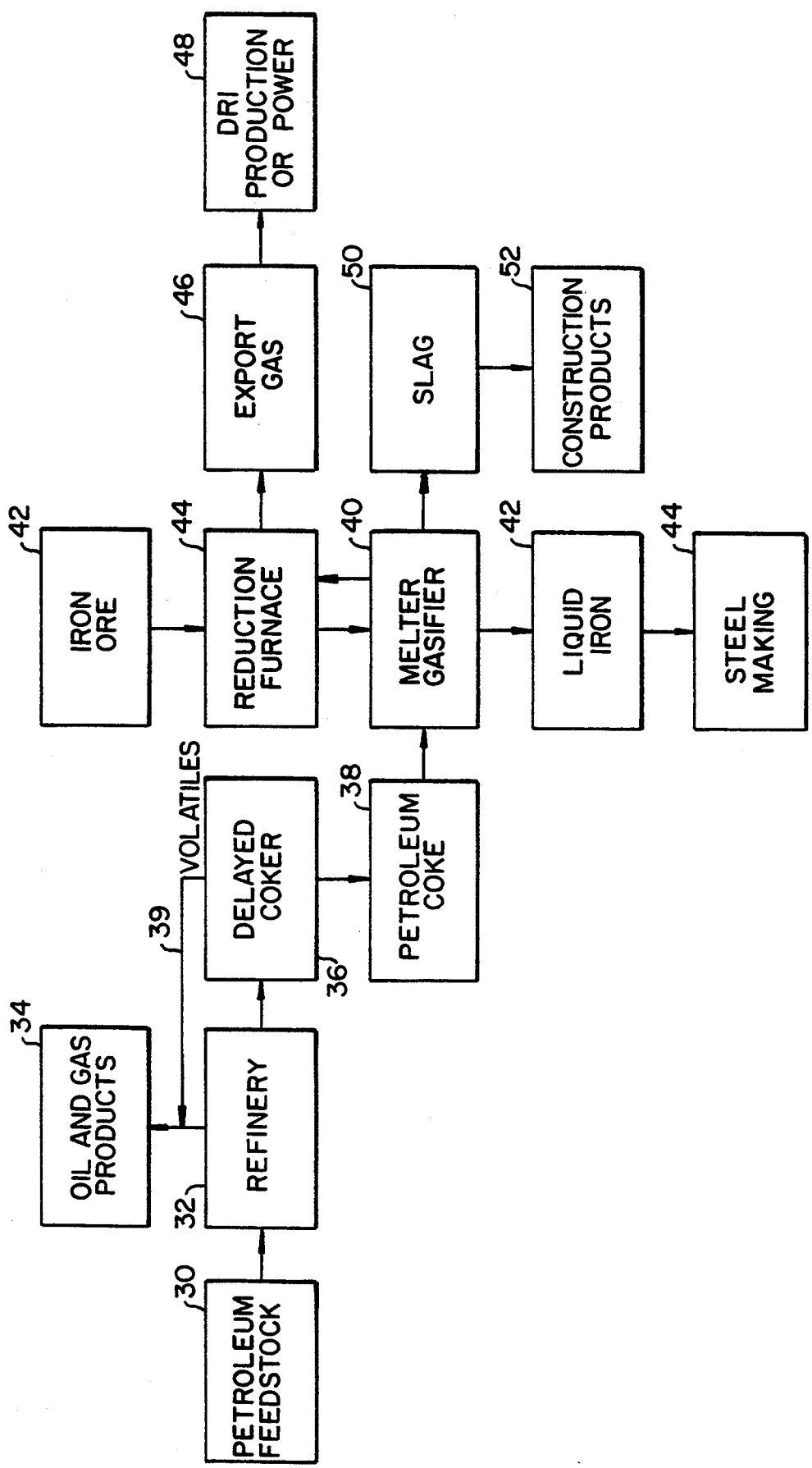
FIG. 1 is a flow diagram illustrating the present invention.

FIG. 1 is a flow diagram illustrating the method of refining crude oil and producing steel in an environmentally desirable manner. Petroleum feedstock 30 is introduced into a refinery 32 where oil and gas products 34 are preferred. The residual coke from the refinery 32 is passed to a delayed coker unit 36 where petroleum coke 38 is produced. Volatiles from the process are returned to the oil and gas products via conduct 39. The petroleum coke amounts to about 6% by weight of the petroleum feedstock being processed.

Heretofore, disposal of the petroleum coke has been a significant problem. However, in accordance with the invention, disposal of the petroleum coke is accomplished in an advantageous manner as a fuel in an iron-making process where a melter gasifier is utilized. Thus, petroleum coke is introduced as a fuel into melter gasifier 40 for combustion with oxygen and iron ore from source 42 which has been reduced in reduction furnace 44. Liquid iron containing heavy metals freed from the combustion of the petroleum coke is recovered in collection vessel 42 for later steel making 44. An export gas 46 rich in CO is produced and may be used in direct reduction of iron or as a fuel for power production 48. Slag is withdrawn from the melter gasifier at slag collection vessel 50. The slag contains the sulfur freed from the combustion of the petroleum coke. Slag is disposed of; for example, by forming construction products 52.

Thus, the present invention provides a method of refining crude oil and producing steel in an environmentally desirable manner. Petroleum products are formed from crude oil in a refinery utilizing a delayed coke processing plant. The delayed coke processing plant produces a sponge petroleum coke residual which includes sulfur and heavy metal components. The petroleum coke is introduced into a melter gasifier. Oxygen containing gas is blown into the melter gasifier and petroleum coke is combusted to form at least a first fluidized bed of coke particles from the petroleum coke. Ferrous material is introduced into the melter gasifier through an entry port in its upper portion. Petroleum coke, oxygen and ferrous material are reacted in the melter gasifier to combust the major portion of the petroleum coke to produce reduction gas and molten iron containing heavy metals freed from combustion of the petroleum coke and a slag containing sulfur freed from combustion of the petroleum coke. The reduction gas is flowed out of the melter gasifier. The molten iron and the slag are also removed from the melter gasifier. The slag is disposed of preferably by converting it to construction material.

Figure 2:
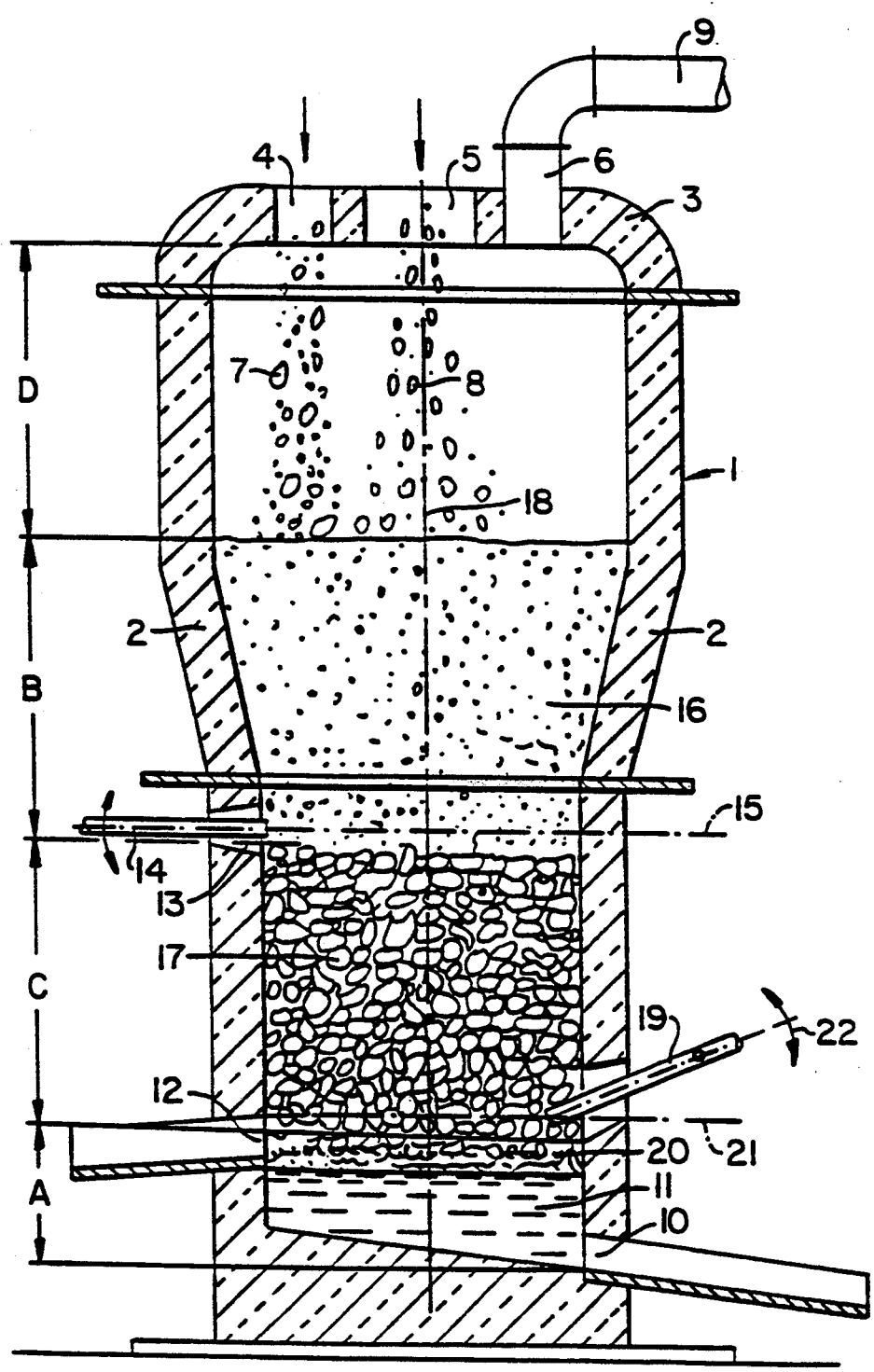
FIG. 2 is a schematic vertical section of a melter gasifier useful in accordance with the present invention.

In accordance with the invention, coal is replaced in part or in total with petroleum coke in iron making processes which utilize a melter gasifier. FIG. 2 schematically illustrates a melter gasifier useful with the present invention. The melter gasifier, generally indicated by the numeral 1 has side walls 2 which are refractory lined on their inner sides. The hood 3 of the melter gasifier 1 has three openings 4, 5 and 6. In accordance with the opening 4 is adopted for charging petroleum coke 7 of various grain or piece sizes into the interior of the melter gasifier. Particulate ferrous material 8 is charged into the melter gasifier through the opening 5, preferably iron sponge. It is suitable to supply the iron sponge at an elevated temperature. To carry away the reduction gas which is formed during the reaction in the melter gasifier, a conduit 9 is provided extending out of opening 6. The reduction gas carried away may be is used in many processes to prereduce or reduce oxidic iron ore.

In general the melter gasifier comprises a lower section A, a central section B, an intermediate section C between sections A and B and an upper section D above the central section B, whose cross section is widened and which serves as an expansion zone. In the bottom region of the lower section A of the melter gasifier 1, which serves to collect molten metal and liquid slag including any sulfur residue from the combustion of petroleum coke, a tapping opening 10 for the melt 11 is provided in the wall 2. Further up the wall, there is an opening 12 for the slag tap in the lower section A. Alternatively, the slag may be tapped with the metal and separated outside the melter gasifier. In the lower region of the central section B of the melter gasifier 1, a nozzle pipe 14 is inserted through an opening 13 in the wall 2. Oxygen-containing carrier gas is injected into the melter gasifier through nozzle pipe 14. If desired, carbon carriers can be introduced into the melter gasifier 1 in a first horizontal blow-in plain 15.

Preferably a plurality of openings 13 with nozzle pipes 14 are present at this location spaced around the melter gasifier. In the central section B, a first fluidized bed zone 16 may be formed by coke particles from combusted petroleum coke. The intermediate section C, which, in the embodiment illustrated, is cylindrically designed, is provided to accommodate a second zone 17 of a fluidized bed formed by coke particles from combustion the petroleum coke. Generally, the coke particles in the fluidized bed in this section of the melter gasifier will have less motion than those in section B. Through the wall of the intermediate section C, gas supply means, in the present case nozzle pipes or tuyeres 19, are inserted. The tuyeres are positioned to direct the gases toward the central axis 18 of the melter gasifier. The tuyeres are adapted for injecting oxygen-containing gas and carbon carriers into the melter gasifier. They project into the second zone 17 of coke particles, ending closely above the slag layer 20. Just one nozzle pipe 19 has been illustrated in FIG. 2 depending on the size of the melter gasifier, 10 to 40 preferably 20 to 30, nozzle pipes 19 may be provided, and located substantially in a second horizontal blow-in plane 21. The nozzle pipes 19 are arranged so as to be vertically pivotable in the direction of the double arrow 22. Also the nozzle pipes 14, through which the carrier gas and additional fuel flow into the first fluidized-bed zone 16 are designed to be vertically pivotable with the embodiment of the invention illustrated.

The ferrous material 8 introduced through the opening 5 at first reaches the first fluidized-bed zone 16 after having fallen through the upper section D of the melter gasifier which serve as an expansion zone, in which the ferrous material is slowed and heated. Smaller particles melt, drop through the second zone 17 of coke particles and descend into the lower section A. Larger particles at first remain lying on the second zone 17 or are held fast in the uppermost layer of this zone, until they are also melted upon the action of the high temperature prevailing in the region of the first blow-in plane 15. In the second zone, the downwardly dropping metal melt is super-heated and, if desired, may be treated by the reaction of fine particle fluxes, which are introduced through the nozzle pipes 19. The metal melt 11 tapped through the opening in 10 is sufficiently hot in order to be subjected to further metallurgical aftertreatments. Above the melt 11, a layer of liquid slag 20 collects. The liquid slag may be stripped off via the tap opening 12. The petroleum coke particles, during operation of the melter gasifier, must be continuously supplemented through the opening 4 with larger pieces, which are preferably used to build up the second zone 17, after falling through the first zone 16. The melter gasifier shown in FIG. 2 and the prior art operation using coal or coke produced from coal are described in U.S. Pat. No. 4,588,437.

In accordance with the present invention, a method is provided for both disposing of an environmentally undesirable material comprising petroleum coke and any sulfur and heavy metals contained therein and of providing fuel for a process of making molten iron or steel preproducts and reduction gas in a melter gasifier. The invention contemplates access to a melter gasifier having an upper fuel charging end, a reduction gas discharging end, a lower molten metal and slag collection end. Entry means are formed in the melter gasifier for charging particulate ferrous material into it. Petroleum coke is introduced into the melter gasifier at the upper fuel charging end. Oxygen-containing gas is blown into the petroleum coke to form at least a first fluidized bed of coke particles from said petroleum coke. Particulate ferrous material is introduced into the melter gasifier through the entry means and the petroleum coke, oxygen and particulate ferrous material are reacted at elevated temperature to combust the major portion of the petroleum coke to produce reduction gas and molten iron or steel preproducts containing heavy metals freed from combustion of the petroleum coke and a slag containing sulfur freed from combustion of petroleum coke. Thus in a broad sense, the present invention involves a method of making molten iron which includes the use of a melter gasifier as a reaction vessel for converting ferrous material to molten iron in a reaction with oxygen and a carbonaceous fuel in the melter gasifier, the improvement comprising providing petroleum coke as the carbonaceous fuel for the reaction.

Figure 3:
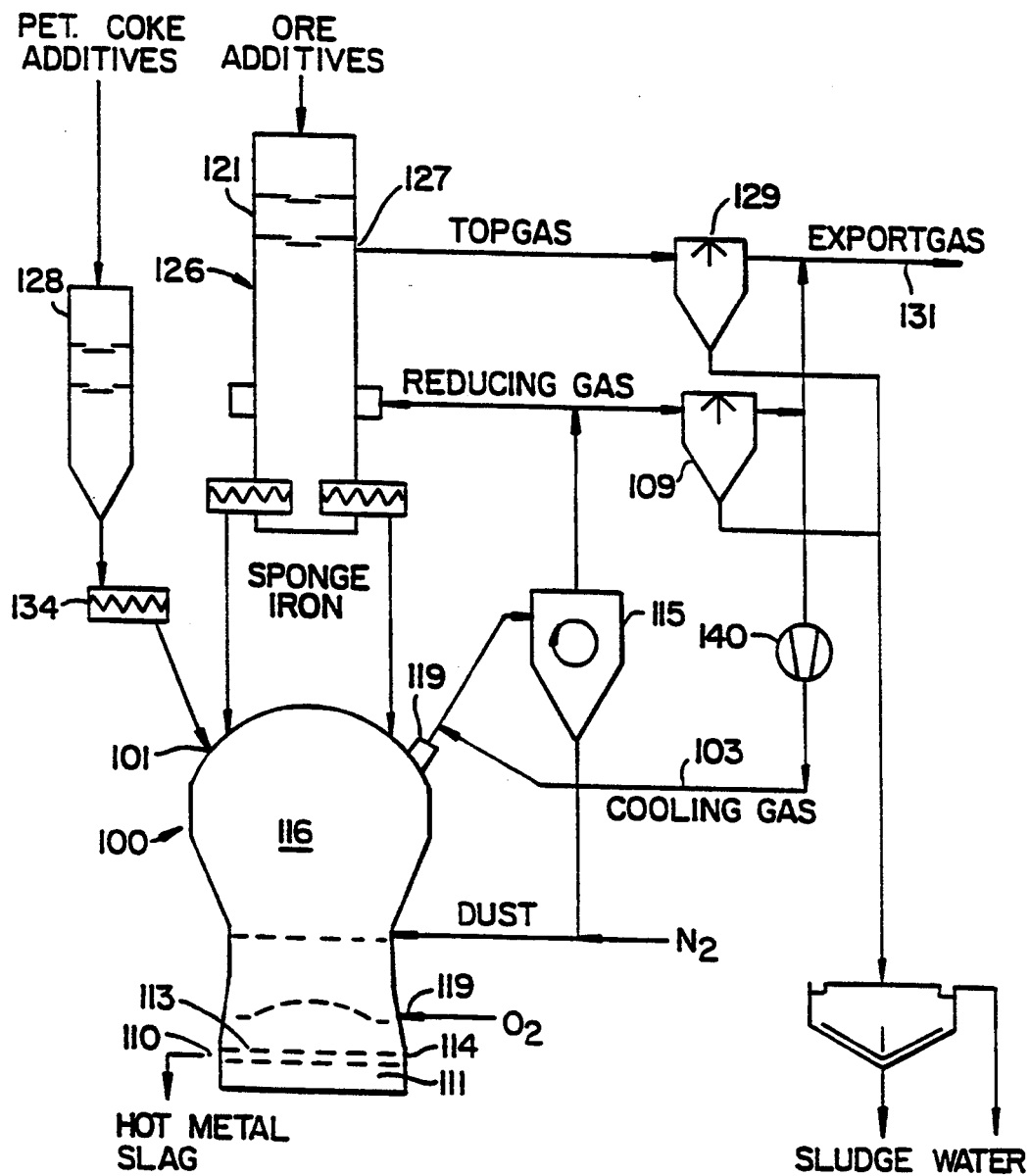
FIG. 3 is a schematic flow sheet illustrating the CO-REX® process in which the method of the present invention is particularly useful.

Refer now to FIG. 3 which is a schematic flow sheet of the COREX ® process in which the method of the invention is particularly useful. The COREX ® process utilizes a melter gasifier substantially similar to the melter gasifier of FIG. 1 and generally indicated in FIG. 3 by the numeral 100. The COREX ® process is designed to operate under elevated gas pressures up to five bar. The process pressure is supplied from the integral oxygen production facility which supplies oxygen through the tuyeres 119 on the COREX ® melter gasifier 100. Gasifier gas pressure from the melter gasifier 100 operates the primary direct reduction furnace 126 for iron ore reduction to sponge iron.

Charging of petroleum coke to the melter gasifier 100 is accomplished through a pressurized lock hopper 128. the iron ore is supplied to the reduction furnace 126 through a similar lock hopper 121 in a manner well known to those skilled in the art. The petroleum coke is stored in a pressurized bin and charged into the melter gasifier by suitable means such as speed controlled feed screw 134.

Upon entering the dome of the melter gasifier 100, at entry port 101, the 10% of residual hydrocarbons contained in the petroleum coke are flashed off at 1100° C. and cracked in the reducing atmosphere to CO and $H_2$. The calcined petroleum coke particles are rapidly heated to 1100° C. and descend with the hot reduced sponge iron particles and hot calcined lime particles from the reduction furnace 126 to the dynamic fluidized bed. The calcined petroleum coke (essentially all carbon) is gasified into CO which rises to the gasifier gas outlet 119.

The sponge is melted in the dynamic particle bed 116 and drops to a molten liquid iron pool 111 accumulated below the oxygen tuyeres 119 on the melter gasifier hearth 114. The silica and alumina oxide content of the sponge iron is fluxed and melted with the calcined lime in the bed to form liquid slag droplets which descend and form a liquid slag layer 113 covering the liquid iron pool 111. The liquid iron and slag are periodically tapped and removed through a taphole 110 from the melter gasifier hearth.

As the calcined coke burns at a high temperature with oxygen above the tuyeres 119, an oxidizing coolant, such as steam or $CO_2$, or both are injected at the tuyere level to maintain the melter gasifier dome temperature of 1100° C. The injected coolants create additional reducing gas with hydrogen forming from reduction of the steam and CO forming from the reduction of the $CO_2$. Coolants normally supplied are steam, air, nitrogen and/or $CO_2$. In addition low grade or low rank coals and other low grade solid carbonaceous fuels, such as refuse, because of their low heating value (less than 10,000 Btu/lb), water content (greater than 10%), high ash (greater than 10%) and volatile matter content (greater than 40%) are readily available and can be applied for a coolant. Low grade or low rank coal or solid carbonaceous fuels fed into the COREX ® gasifier at ambient temperature will dilute the hot combustion products from oxygen and petroleum coke and reduce the flame and dome temperatures within the gasifier. The combined reducing gases rise to the gasifier gas outlet main 119 at 1100° C. where they are tempered with a side stream from the cooling gas scrubber 109 and cooling gas blower 140 via line 103 to 850° C. before passing to the hot cyclone 115 and the reduction furnace 126. The gasifier gas cooling is essential to avoid fusion and maintain discrete free flowing particles in the column of the reduction shaft furnace 126. Overheating will cause clusters or clinkers to form inside the shaft furnace with disruption of the furnace solids and gas flow.

After being cooled in the cooling gas scrubber 109 and cleaned of dust in the hot cyclone 115, the gasifier gas is passed upward in the reduction furnace 126 through the descending bed of iron ore converting it to metallic sponge iron and carburizing the reduced iron to a level of three to five percent prior to hot discharge to the melter gasifier 100. The gasifier gases are partially consumed by the reaction in the reduction furnace and discharged at 127 as furnace top gas at 140° C. The top gases are cleaned in the top gas wet scrubber 129, removing water vapor formed during iron ore reduction and discharged as export gas 131 at 40° C. The export gas is low in particulates and sulfur and has a heating value of 220 Btu/scf while containing 25% of $CO_2$.

Petroleum coke is a useful fuel and energy resource for ironmaking whether liquid iron or direct reduced iron is produced. It is a particularly desirable and surprisingly superior fuel for making liquid iron in the COREX ® process and other processes which utilize a melter gasifier such as described in the Background portion of this specification. Petroleum coke as far as is known has never been used in blast furnace ironmaking because of its low structural strength and hydrocarbon content. Petroleum coke will not support the weight of the burden column in the blast furnace and the hydrocarbons distill off fouling the blast furnace gas cleaning system. The blast furnace gas cleaning system is not designed to handle tars and hydrocarbons.

The COREX ® reduction system incorporates a primary direct reduction shaft furnace and a melter gasifier. The melter gasifier permits operation using petroleum coke and oxygen as the energy and reducing gas source for iron ore reduction and metal production. The product from the COREX ® reduction and melter gasifier unit is liquid iron tapped at 1500° C. and medium Btu export gas having a heating value of 220 Btu/scf.

The metallized iron ore is melted by the heat from the petroleum coke combustion and gasification in the melter gasifier fluid bed, and the molten metal collects on the gasifier hearth in the same manner as the conventional blast furnace. The liquid metal from the COREX ® gasifier has the same composition and analysis as blast furnace hot metal with 0.5% silicon and 4.5% of carbon and the same tapping temperatures.

Petroleum coke and oxygen at 6 bar pressure are injected into the melter gasifier along with hot (850° C.) reduced metallized lump ore and pellets from the reduction furnace. Reformed gas from the reaction of the petroleum coke and oxygen in the gasifier is cleaned, temperature controlled and supplied as reducing gas for the reduction furnace. After the iron ore reduction, medium Btu top gas from the reduction furnace is scrubbed and exported as the energy source for power generation at a heating value of 220 Btu/scf.

There is a minimum of 1050° C. dome temperature for the COREX ® melter gasifier to effectively crack and eliminate tars and hydrocarbons from the gasifier reduction gas. Low grade or low rank coals and other low grade solid carbonaceous fuels, such as refuse, can not be used alone as COREX ® fuel because their low heating value (less than 10,000 Btu/lb), water content (greater than 10%), high ash (greater than 10%) and volatile matter content (greater than 40%) does not allow the attainment of the minimum 1050° C. minimum dome temperature necessary to avoid tars and hydrocarbons in the gasifier offgas. Tars and hydrocarbons are not a problem when petroleum coke is used as solid fuel, as the maximum dome temperature of 1100° C. will be exceeded unless a coolant is supplied to maintain the 1100° C. maximum temperature.

Low grade and low rank solid fuels can be used in the COREX ® only if the amendment, petroleum coke with a high heating value, is supplied to attain the 1100° C. dome temperature of the gasifier. With lignite or brown coal at a heating value of 5,000 Btu/lb, the petroleum coke amendment must be at least 50% to maintain the required dome temperature. With Wyoming subbituminous coal having a heating value of 8,500 Btu/lb, the petroleum coke amendment can be reduced to 25% and still maintain the required gasifier dome temperature. Other slightly higher rank coals or fuels may require only 10% of the petroleum coke amendment to make their utilization viable as COREX ® fuel.

Petroleum coke contains more sulfur than either metallurgical coke or coals typically used in iron-making. Yet it is a desirable iron-making reductant due to its low cost, high heat content and high carbon content. A process utilizing petroleum coke to produce molten metal must therefore provide suitable means to collect the sulfur released during combustion especially for production based on high-quality ferrous raw materials. Such a process (based on a high-quality ferrous raw material) would generally produce smaller amounts of slag. Because the slag must collect sulfur from ore and reductant, care must be taken to add suitable slagging material so that a slag of high sulfur capacity is generated in accordance with the invention. In a process to produce molten iron, which uses a melter-gasifier and a separate moving column reduction reactor to reduce the incoming iron-containing raw material, where the reductant is petroleum coke, an oxide slag of high sulfur capacity is provided.

Sulfur solubility is commonly described by a sulfur capacity function, which combines a composition factor describing environment, with the amount of sulfur actually contained in a slag. Thus this sulfur capacity function is an intrinsic (temperature-dependent) property of a slag. Conversion of known sulfur capacity values to actual sulfur content of slags hypothetically at chemical equilibrium requires a simple thermodynamic analysis and estimation of certain composition factors.

Sulfur capacity is defined as follows:

$$C_s = (P_{O_2}/P_{S_2})^{\frac{1}{2}}(\text{wt. \% S}) \quad (1)$$

To evaluate the actual sulfur content of a slag known to have a certain sulfur capacity, the ratio of oxygen partial pressure to sulfur partial pressure in the reactor zone where slag forms must be evaluated. Some typical gas compositions of derived off gas for two petroleum cokes and a coal are shown in Table 1; oxygen and sulfur are commonly not among the known quantities, and must be derived.

Table 1 shows typical gas compositions for petroleum coke and coal ironmaking.

TABLE 1

| | GAS COMPOSITIONS (PERCENT) | | |
|---|---|---|---|
| | Petroleum Coke | | |
| Constituents | A | B | Coal |
| CO | 81.0 | 74.8 | 62.3 |
| CO₂ | 2.6 | 2.5 | 2.5 |
| H₂ | 10.0 | 15.7 | 28.6 |
| H₂O | 1.5 | 1.0 | 2.1 |
| CH₄ | 1.6 | 1.5 | 1.5 |
| N₂ | 3.3 | 4.5 | 3.0 |
| H₂S | 0.005 | 0.005 | 0.005 |

Using equilibrium constant expressions for the chemical reactions below, simple expressions for the required oxygen:sulfur ratio may be obtained.

$$H_2 + \tfrac{1}{2}S_2 = H_2S \quad (A)$$

$$CO + \tfrac{1}{2}O_2 = CO_2 \quad (B1)$$

$$H_2 + \tfrac{1}{2}O_2 = H_2O \quad (B2)$$

The equilibrium constant expressions for these reactions are:

$$K_A = \frac{P_{H_2S}}{P_{H_2} \cdot P_{S_2}^{\frac{1}{2}}} \quad (2)$$

$$K_{B1} = \frac{P_{CO_2}}{P_{CO} \cdot P_{O_2}^{\frac{1}{2}}} \quad (3)$$

$$K_{B2} = \frac{P_{H_2O}}{P_{H_2} P_{O_2}^{\frac{1}{2}}} \quad (4)$$

Equations 2 and 3 may be combined to yield the desired ratio $P_{O_2}:P_{S_2}$ as follows:

$$(P_{S_2}/P_{O_2})^{\frac{1}{2}} = \left(\left(\frac{P_{H_2S}}{P_{H_2} \cdot K_A}\right)^2 \bigg/ \left(\frac{P_{CO_2}}{P_{CO} \cdot K_{B1}}\right)^2\right)^{\frac{1}{2}} = \quad (5)$$

$$\left(\frac{P_{H_2S} \cdot P_{CO}}{P_{CO_2} \cdot P_{H_2}}\right)\left(\frac{K_{B1}}{K_A}\right)$$

but it is even easier to combine equations 2 and 4.

$$(P_{S_2}/P_{O_2})^{\frac{1}{2}} = \left(\left(\frac{P_{H_2S}}{P_{H_2} \cdot K_A}\right)^2 \bigg/ \left(\frac{P_{H_2O}}{P_{H_2} \cdot K_{B2}}\right)^2\right)^{\frac{1}{2}} = \quad (6)$$

$$\left(\frac{P_{H_2S}}{P_{H_2O}}\right)\left(\frac{K_{B2}}{K_A}\right)$$

The values for the equilibrium constants may be calculated from standard thermodynamic data. In this way it can be seen that solubility of sulfur in a particular slag depends on a composition-dependent quantity, and sulfur capacity, which is an intrinsic property of a particular slag.

Using thermodynamic data for CO, CO₂, H₂O and H₂S from JANAF Thermochemical Tables, 2nd Edition, the pertinent equilibrium constants have been calculated.

TABLE 2

| CALCULATED EQUILIBRIUM CONSTANTS | | | |
|---|---|---|---|
| | Slag Temperatures | | |
| Constant/Reaction | 1427° C. | 1527° C. | 1627° C. |
| $K_A/H_2 + \tfrac{1}{2} S_2 = H_2S$ | 1.601 | 1.123 | 0.817 |
| $K_{B1}/CO + \tfrac{1}{2} O_2 = CO_2$ | 14779 | 4931 | 1850 |
| $K_{B2}/H_2 + \tfrac{1}{2} O_2 = H_2O$ | 50013 | 18646 | 7702 |

Choosing a calcium-aluminate slag of sulfur capacity 0.01, such as CaO—Al₂O₃ at 60 mole percent lime, and a calcium-silicate slag of sulfur capacity 0.001, such as at 60 mole percent of lime, the sulfur contents of the slags in equilibrium with each of the gases in Table 1 may be calculated.

Table 3 shows calculated sulfur contents (weight percent) of a calcium aluminate slag, having sulfur capacity 0.01, and a calcium-silicate slag having a sulfur capacity of 0.001, in equilibrium with petroleum coke and coal iron-making gases of Table 1.

TABLE 3

CALCULATED SLAG SULFUR CONTENTS

| Temperature °C./Slag Type | Petroleum Cokes A | B | Coal |
|---|---|---|---|
| 1427/CaO.Al$_2$O$_3$ | 57.81 | 69.85 | 48.20 |
| 1427/CaO.SiO$_2$ | 5.78 | 6.99 | 4.82 |
| 1527/CaO.Al$_2$O$_3$ | 30.73 | 37.13 | 25.62 |
| 1527/CaO.SiO$_2$ | 3.07 | 3.71 | 2.56 |
| 1627/CaO.Al$_2$O$_3$ | 17.45 | 21.08 | 14.55 |
| 1627/CaO.SiO$_2$ | 1.74 | 2.11 | 1.45 |

However, this calculation is based on equilibration of slag and a hypothetical gas phase. Furthermore, in practice, slag/gas equilibrium is unlikely to be obtained. Nevertheless, the above calculations indicate that slag sulfur solubilities in accord with accepted practices of COREX ® and blast furnace ironmaking can be obtained and exceeded with appropriate selection of slags and gas composition. Table 3 shows that with usage of high sulfur petroleum coke as fuel, an improved desulfurizing slag is provided for ironmaking using a calcium aluminate slag having a bases-to-acids ratio of 1:1 to 2:1 lime-to-alumina on a mole weight basis.

Some coals and petroleum cokes are high in sulfur, ranging from 2 to 6% in content. The Corex system is a good desulfurizer, but the 1:1 lime-to-silica slag commonly used for ironmaking in the Corex and blast furnace is limited in sulfur absorbing capacity to approximately 3% of sulfur in the slag. At a 1:1 lime-to-silica ratio, the silica in the slag competes with the sulfur for reaction and combination with the lime content of the slag preventing additional sulfur absorption. Sulfur absorption can therefore be improved by increasing the lime-to-silica ratio to 1:1.2 or more, exceeding the stoichiometric silica demand for lime, and with the excess lime serving to combine with the excess sulfur.

Table 3 shows that by replacing the silica in the slag with alumina at a slag basicity of 1:1 to 2:1 lime-to-alumina, the sulfur content of the iron making slag can be increased markedly from 1.5 to 6% with the silica to 14 to 57% of sulfur with the alumina. The alumina does not compete strongly with the sulfur for the lime present as does the silica. With calcium-aluminate slags, the slag weight can be reduced to 10% of the weight of the calcium-silicate slag with equivalent sulfur removal capacity. The improvements in slag sulfur capacity and sulfur concentration in the lime-alumina slag are illustrated on the above table with three typical reducing gas compositions—two with high carbon monoxide content from petroleum coke and one with a lesser level of carbon monoxide from steam coal. In addition the use of high carbon monoxide reducing gas with 75 to 81% of CO from the petroleum coke as compared to steam coal with 62% of CO is advantageous for slag sulfur removal. In the presence of high CO from the petroleum coke gases, sulfur capacity of the slag is 30% higher than with the gas from steam coal. This is true for both the calcium aluminate and calcium silicate slags and over the temperature range from 1427° to 1627° C.—tapping temperatures for liquid iron. Slag sulfur capacity with both aluminate and silicate slags decreases with increasing hot metal temperatures with the slags having about one-third the sulfur capacity at 1627° C. to slags at a temperature of 1427° C. Normal slag tapping temperature for the Corex iron making is 1470° C.

In accordance with the invention when using petroleum coke, there are four methods for handling high sulfur in the process.

1. Addition of excess lime or MgO (magnesia) exceeding stoichiometric amounts and in excess of 1.2 lime-to-silica ratio up to 2.6 of lime-to-silica ratio such that CaS and/or MgS is formed with the excess sulfur above the stoichiometric lime-to-silica ratio during ironmaking and separated from liquid iron external to the COREX ®. Limestone is preferably added in the reduction furnace and calcined to lime during heating to process temperatures to provide the lime for the reaction. Dolomite may also be used.

2. A slag free desulfurizing system with low or no silica iron ore and ash free petroleum coke such that all sulfur is absorbed (dissolved) in the liquid iron. Sulfur bearing liquid iron is subsequently desulfurized externally with lime, CaC$_2$ and/or Mg metal pneumatically injected into the iron to extract the sulfur as calcium or magnesium sulfide.

3. In a low silica or silica free system, addition of lime or MgO (magnesia) by adding limestone or dolomite to the reduction furnace to form basic sulfide slag in the melter gasifier which is subsequently separated by gravity (floats on liquid iron) and is removed external to the COREX ® ironmaking. The amount of limestone or dolomite added will vary. The amount, however, should be at least on a stoichiometric basis. Excess base is normally added up to 2.6 times the stoichiometric requirement. Lime is added until iron losses as FeO appear in the slag. Any silica or alumina present will require a stoichiometric amount of lime and magnesia. Sulfur in petroleum coke and other feed components is sampled and monitored to determine lime and magnesia addition. It is suitable to supply the iron sponge and calcined limestone and dolomite at an elevated temperature. The reduction gas carried away is used in many processes to prereduce or reduce oxidic iron ore. When using petroleum coke having a very high sulfur content, it may be desirable to provide a scrubbing process for removing H$_2$S from the reduction cooling gas. An iron chelating process which converts the H$_2$S to elemental sulfur is useful in this instance.

4. Substitution of a calcium aluminate slag, all or in part for calcium silicate slag, as CaO.Al$_2$O$_3$ has 10 times the sulfur bearing capacity of CaO.SiO$_2$. Ash free petroleum coke with added bauxite, clay or shale and lime added with the iron ore form a CaO.Al$_{2O3}$ slag which absorbs sulfur and has high sulfur capacity. High sulfur aluminate slag is separated from the liquid iron external to the COREX ® ironmaking.

Petroleum coke provides a low ash fuel or energy resource for ironmaking and direct reduction which eliminates or minimizes slag formation in the production of steel or liquid iron. In ironmaking with coal or coke made from coal, the fuel has a content of 10% or more of ash inerts (basically shale or clay) which must be fluxed with limestone and disposed of as slag to remove from the system. Nominally this slag amounts to 500 pounds for each ton of liquid iron produced. Minimization of slag formation is an obvious economic advantage. Assuming an iron ore feed to the CO- REX® reduction furnace with little or no silica gangue, there is a potential for a slag free liquid iron operation of the COREX® using the ash free petroleum coke.

In addition, the low ash and high carbon content of petroleum coke is advantageous for existing solid fuel direct reduction systems such as mentioned above since lower gangue direct reduced iron is produced for steelmaking, plus the petroleum coke improves the solid fuel reduction system thermal efficiency because of its low volatiles content. Hydrocarbons in the solid fuel for direction reduction are basically lost as volatiles before the iron ore reaches reduction temperatures. Solid fuel iron ore reduction depends on the fixed carbon content of the solid fuel used as a reductant and petroleum coke has a 90% content. Fixed carbon in a steam coal is nominally 60%.

High grade lump iron ore or pellets for solid fuel direct reduction normally contain 3 to 5% of silica. The silica is residual gangue which is not removed in the iron ore concentration process. As a result, when coal is used as the carbonaceous fuel as taught heretofore for direct reduction of iron, the silica derived from the iron ore alone will result in the formation of 300 to 500 pounds of steelmaking slag per ton of steel which is an extra heat load. The ash from a 40 to 50% coal reductant addition contributes another 250 pounds for 550 to 750 pounds of slag per ton of steel. This amount of slag is excessive since as little as 50 to 75 pounds of slag per ton of steel are normally needed for refining purposes.

Excessive slag formation and melting with low quality direct reduced iron requires increased power consumption in electric furnace steelmaking compared with furnace operation with slag free iron and steel scrap. For this reason steelmaking furnaces are seldom burdened with a 100% direct reduced iron charge. Thus, direct reduced iron production with a low ash low volatile solid fuel such as petroleum coke promotes a major reduction in process slag and is a significant steel making advantage.

A fuel with a higher flame temperature when combusted with oxygen compared to other solid fuels enables a reduction in the amount of fuel consumption and improved furnace productivity per unit weight of fuel. The heating value of petroleum coke is 15,000 Btu/lb compared to 12,000 to 13,000 Btu/lb for coal and coke made from coal. This results in an adiabatic flame temperature 600° C. to 900° C. higher than with coal or coke made from coal which contain significant quantities of inert ash diluent when burned under the same conditions with oxygen.

Petroleum coke is an ideal fuel for COREX® ironmaking as it is high in carbon and has no ash content. Petroleum coke provides a high adiabatic flame temperature which is advantageous for maintaining the melter-gasifier dome temperatures for cracking tar and hydrocarbons. Many low rank high ash coals do not have adequate adiabatic flame temperatures with oxygen to sustain the dome temperatures required for COREX® melter gasifier operation.

Furthermore, the use of petroleum coke in the COREX® process provides the manufacture of a superior reducing gas for direct reduction having a high proportion of contained carbon monoxide reducing gas. Direct reduction of iron ore was heretofore conducted using natural gas fuel as the source of reductant. In general there are two natural gas based processes for direct reduction—one of which reforms the natural gas with steam (HyL) and the other which reforms the natural gas with $CO_2$ (Midrex). Steam reforming produces a reducing gas that is predominantly hydrogen, 75%, and 25% CO. $CO_2$ reforming with the Midrex system produces a reducing gas which is 50% $H_2$ and 50% CO. Midrex direct reduction units operated with the $CO_2$ gas reforming system, experience significantly lower clustering and particle fusion in the reducing furnace as a consequence of the higher level of CO in the reducing gas.

All of the natural gas based direct reduction furnaces experience clustering to some degree and as such are equipped with one or more levels of cluster breakers in the furnace bottom to maintain solids flow. These furnaces also must operate at lower process gas temperatures (750° C.) to avoid clustering or fusion. Furnace productivity and product stability (quality) are reduced by the lower allowable processing gas temperatures.

COREX® operated with coal produces an increased level of CO content in the reducing gases compared to the gas based direct reduction furnaces. The nominal ultimate analysis of steam coal is 85% carbon and 15% hydrogen compared to natural gas containing 75% carbon and 25% hydrogen. Reducing gases produced from coal nominally have a 60% CO content compared to 25% to 50% for natural gas based reduction furnaces.

When the COREX® process is operated with petroleum coke in accordance with the present invention the carbon content of the fuel is 97% carbon and 3% hydrogen (10% hydrocarbons). As a result, a superior CO level of above 70% and up to 85% is reached in reducing gases prepared from petroleum coke.

The COREX® reduction furnace, using high CO reducing gases from coal, has no cluster breakers and produces a fully reduced high stability product from laminated lump ores and sinter compared to the natural gas based reduction furnaces (HyL and Midrex) which have limited tolerance for these marginal feed materials. Clustering is not experienced in the COREX® reduction furnace. In addition, the COREX® reduction furnace is operated at a process gas temperature of 850° C., a 100° C. higher processing temperature than the normal natural gas based reduction furnaces.

The high CO reducing gases from the petroleum coke allow higher process gas temperatures during reduction which contribute to increased productivity and improved direct reduced iron quality and stability.

Petroleum coke provides an improved high carbon monoxide level reducing gas which prevents sintering and clustering of the reduced metallic iron. High CO level reducing gases have a two-fold advantage which minimizes clustering, (1) the low $H_2$ gas content minimizes the occurrence of catastrophic metallic iron recrystallization promoting cluster formation during reduction and (2) the CO reducing gas has a tendency to form a carbon layer and $Fe_3C$ coating by inversion at the surface of the reduced metallic iron particles acting as a lubricant and preventing sintering of the iron particles.

The use of petroleum coke provides a reduced iron product with increased level of carburization which is highly advantageous as an energy source for subsequent iron and steelmaking processes. The high CO reducing gases from combustion of petroleum coke increase the level of carburization of the metallic iron in the reduction furnace. Reduced iron pellets from the COREX® reduction furnace have a carbon content of 3.5% as $Fe_3C$, and the porous reduced laminated iron ore and sinter from the COREX® reduction furnace have a carbon content of 1.5% as $Fe_3C$ plus 3.0 to 3.5% of carbon contained in the pores for a product carbon content ranging from 3.5 to 5.0%.

In contrast, natural gas based reduction furnaces used heretofore commonly produce reduced iron containing 1.5% carbon. With a special circuit added to the gas based reduction furnaces, methane can be injected into the lower furnace cooling zone which increases the carbon content to 3.0% in the reduced product.

The high level of contained carbon in the reduced iron from the COREX® reduction furnace is extremely advantageous for downstream iron and steelmaking processes as the carburized iron forms its own energy source. The use of petroleum coke in the COREX® process with the resultant high carbon monoxide reducing gases increases the carbon content of the direct reduced iron to above 5.0 to 6.0% and even to 6.5%. The contained carbon in the direct reduced iron is an energy source which is beneficial to COREX® ironmaking and to steelmaking whether in an electric arc furnace, an oxygen converter or an energy optimizing furnace. This is especially true in the electric arc furnace as the contained carbon permits formation of a favorable foamy slag practice during steelmaking. The use of petroleum coke as a fuel in the COREX® process is also advantageous in that recycle and use of $CO_2$ as a cooling gas with petroleum coke for the high temperature control of the melter gasifier dome temperatures is made possible. With high heating value coals and oxygen combustion as was done heretofore, allowable melter gasifier dome temperatures are exceeded. Low pressure six bar steam is commonly injected through the tuyeres to control the melter gasifier temperatures and maintain a dome temperature of 1100° C. or less. Steam, however, increases the hydrogen level of the gasifier reducing gases.

When using high adiabatic flame temperature petroleum coke and oxygen in accordance with the present invention, flame temperatures are 900° C. higher than with coal as used before the present invention and a cooling gas must be supplied for temperature control. In accordance with the present invention, dome temperatures are controlled by injecting six bar $CO_2$ at the tuyeres. With 20% injection of $CO_2$ at the tuyeres, the dome temperature is maintained at 1100° C. The $CO_2$ serves as a melter gasifier coolant and an oxidizer for the petroleum coke forming additional CO and maintaining a dome temperature of 1100° C. and a level of 85% and above of CO in the gasifier gases. The $CO_2$ reduces COREX® process oxygen consumption by about 8%, improving process economics. The $CO_2$ is an advantageous cooling gas for controlling the dome temperature of the melter gasifier and minimizing release of $CO_2$ to the atmosphere when using petroleum coke as a fuel.

This present invention provides a method for both disposing of an environmentally undesirable material comprising petroleum coke and any sulfur and heavy metals contained therein and of providing fuel for a process of making molten iron or steel preproducts and reduction gas in a melter gasifier. The invention contemplates access to a melter gasifier having an upper fuel charging end, a reduction gas discharging end, a lower molten metal and slag collection end. Entry means are formed in the melter gasifier for charging particulate ferrous material into it. Petroleum coke is introduced into the melter gasifier at the upper fuel charging end. Oxygen-containing gas is blown into the petroleum coke to form at least a first fluidized bed of coke particles form said petroleum coke. Particulate ferrous material is introduced into the melter gasifier through the entry means and the petroleum coke, oxygen and particulate ferrous material are reacted at elevated temperature to combust the major portion of the petroleum coke to produce reduction gas and molten iron or steel preproducts containing heavy metals freed from combustion of the petroleum coke and a slag containing sulfur freed from combustion of petroleum coke. Thus in a broad sense, the present invention involves a method of making molten iron which includes the use of a melter gasifier as a reaction vessel for converting particulate ferrous material to molten iron in a reaction with oxygen and a particulate carbonaceous fuel in the melter gasifier, the improvement comprising providing petroleum coke as the carbonaceous fuel for the reaction.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall within the spirit and scope of the present invention as defined in the following claims are expressly intended to be embraced thereby.

What is claimed is:

1. A method for both disposing of an environmentally undesirable material comprising petroleum coke and the sulfur and heavy metals contained therein and of providing fuel for a process of making molten iron or steel preproducts and reduction gas in a melter gasifier which method comprises providing a melter gasifier having an upper fuel charging end, a reduction gas discharging end, a lower molten metal and slag collection end, and means providing an entry for charging ferrous material into said melter gasifier; introducing petroleum coke into said melter gasifier at said upper fuel charging end; blowing oxygen-containing gas into the petroleum coke to form at least a first fluidized bed of coke particles from said petroleum coke; introducing particulate ferrous material into said melter gasifier through said entry means, reacting petroleum coke, oxygen and particulate ferrous material to combust the major portion of the petroleum coke to produce reduction gas and molten iron containing heavy metals freed from combustion of the petroleum coke and a slag containing sulfur freed from combustion of the petroleum coke.

2. In a process of making molten iron which includes the use of a melter gasifier as a reaction vessel for converting ferrous material to molten iron in a reaction with oxygen and a carbonaceous fuel in said melter gasifier, the improvement comprising obtaining petroleum coke from a refinery and using said petroleum coke as the carbonaceous fuel for said reaction whereby the petroleum coke is substantially combusted and sulfur freed from said petroleum coke is captured by slag formed in said process and the heavy metals from said petroleum coke are captured in the molten iron.

3. An improvement to a molten iron making process comprising the steps of introducing petroleum coke into a melter gasifier; blowing oxygen containing gas into said melter gasifier and combusting petroleum coke to form at least a first fluidized bed of coke particles from said petroleum coke; introducing ferrous material into said melter gasifier through an entry port in the upper portion thereof; reacting petroleum coke, oxygen and reduced ferrous material in said melter gasifier to combust the major portion of said petroleum coke to produce reduction gas and molten iron containing heavy metals freed from combustion of the petroleum coke and a slag containing sulfur freed from combustion of the petroleum coke; flowing reduction gas out of said melter gasifier; combining said reduction gas with a side stream of cool reducing gas to form a cooled reduction gas; directing said cooled reduction gas to a reduction furnace which is operably connected to said melter gasifier and mixing said cooled reduction gas with iron ore in said reduction furnace to convert the iron ore to metallic sponge iron and to carbonize the sponge iron prior to discharging it to the melter gasifier for further processing.

4. The method of claim 3 further characterized in that said reduction gas is mixed with steam in the melter gasifier prior to being removed from said melter gasifier to form a combined reducing gas.

5. The method of claim 3 further characterized in that said reduction gas is mixed with $CO_2$ in the melter gasifier prior to being removed from said melter gasifier to form a combined reducing gas.

6. The method of claim 4 further characterized in that the temperature of said combined reducing gas leaving the melter gasifier is about 1100° C.

7. The method of claim 6 further characterized in that said combined reducing gas is mixed with a stream of cool reduction gas to form a mixed gas having a temperature of about 850° C. and flowing said mixed gas to a reduction furnace.

8. The method of claim 5 further characterized in that the temperature of said combined reducing gas leaving the melter gasifier is about 1100° C.

9. The method of claim 8 further characterized in that said combined reducing gas is mixed with a stream of cool reduction gas to form a mixed gas having a temperature of about 850° C. and flowing said mixed gas to a reduction furnace.

10. An iron making process comprising the steps of introducing petroleum coke into a melter gasifier; blowing oxygen containing gas into said melter gasifier and combusting petroleum coke to form at least a first fluidized bed of coke particles from said petroleum coke; introducing ferrous material into said melter gasifier through an entry port in the upper portion thereof; reacting petroleum coke, oxygen and ferrous material in said melter gasifier to combust the major portion of said petroleum coke to produce reduction gas and molten iron containing heavy metals freed from combustion of the petroleum coke and a slag containing sulfur freed from combustion of the petroleum coke; flowing reduction gas out of said melter gasifier; combining said reduction gas with a side stream of cool reducing gas to form a cooled reduction gas; directing said cooled reduction gas to a reduction furnace which is operably connected to said melter gasifier, passing said cooled reduction gas upward through the iron ore in said reduction furnace to convert the iron ore to metallic sponge iron and to carbonize the sponge iron prior to discharging it to the melter gasifier for further processing and removing top gas from said reduction furnace for export.

11. The method of claim 10 further characterized in that said reduction gas is mixed with steam in the melter gasifier prior to being removed from said melter gasifier to form a combined reducing gas.

12. The method of claim 10 further characterized in that said reduction gas is mixed with $CO_2$ in the melter gasifier prior to being removed from said melter gasifier to form a combined reducing gas.

13. The method of claim 10 further characterized in that a coolant selected from the group consisting of steam, air, nitrogen, $CO_2$, low grade coal and low grade carbonaceous fuel is added to the melter gasifier to control the dome temperature of the melter gasifier to about 1100° C.

14. The method of claim 11 further characterized in that the temperature of said combined reducing gas leaving the melter gasifier is about 1100° C.

15. The method of claim 14 further characterized in that said combined reducing gas is mixed with a stream of cool reduction gas to form a mixed gas having a temperature of about 850° C. and flowing said mixed gas to a reduction furnace.

16. The method of claim 12 further characterized in that the temperature of said combined reducing gas leaving the melter gasifier is about 1100° C.

17. The method of claim 16 further characterized in that said combined reducing gas is mixed with a stream of cool reduction gas to form a mixed gas having a temperature of about 850° C. and flowing said mixed gas to a reduction furnace.

18. The method of claim 10 further characterized in that water vapor is removed from said top gas prior to export.

19. An iron making process which substantially reduces slag formation comprising the steps of introducing petroleum coke into a melter gasifier; blowing oxygen containing gas into said melter gasifier and combusting petroleum coke to form at least a first fluidized bed of coke particles from said petroleum coke; reducing ferrous material in a reduction furnace to sponge iron; introducing said sponge iron into said melter gasifier through an entry port in the upper portion thereof; reacting petroleum coke, oxygen and sponge iron in said melter gasifier to combust the major portion of said petroleum coke to produce reduction gas and molten iron containing heavy metals freed from combustion of the petroleum coke and a substantially reduced slag containing sulfur freed from combustion of the petroleum coke.

20. The method of claim 19 further characterized in that limestone is added to said reduction furnace in an amount so that the lime exceeds the stoichiometric amount of silica present in the process by at least 1.2.

21. The method of claim 19 further characterized in that bauxite, shale or clay are added to the reduction furnace in an effective amount to produce calcium aluminate slag.

22. An improvement to a molten iron making process comprising the steps of introducing petroleum coke into a melter gasifier; blowing oxygen containing gas into said melter gasifier and combusting petroleum coke to form at least a first fluidized bed of coke particles from said petroleum coke; introducing ferrous material into said melter gasifier through an entry port in the upper portion thereof; reacting petroleum coke, oxygen and ferrous material in said melter gasifier to combust the major portion of said petroleum coke to produce a reduction gas having a CO level of above about 70% and molten iron containing heavy metals freed from combustion of the petroleum coke and a slag containing sulfur freed from combustion of the petroleum coke; and flowing reduction gas out of said melter gasifier.

23. An improvement to a molten iron making process which substantially reduces slag formation and increases the contained carbon level in the iron comprising the steps of introducing petroleum coke into a melter gasifier; blowing oxygen containing gas into said melter gasifier and combusting petroleum coke to form at least a first fluidized bed of coke particles from said petroleum coke; introducing ferrous material into said melter gasifier through an entry port in the upper portion thereof; reacting petroleum coke, oxygen and ferrous material in said melter gasifier to combust the major portion of said petroleum coke to produce reduction having a CO level of above about 70% gas and molten iron containing heavy metals freed from combustion of the petroleum coke and a reduced processed slag containing sulfur freed from combustion of the petroleum coke; flowing reduction gas out of said melter gasifier; combining said reduction gas with a side stream of cool reducing gas to form a cooled reduction gas; directing said cooled reduction gas to a reduction furnace which is operably connected to said melter gasifier and mixing said cooled reduction gas with iron ore in said reduction furnace to convert the iron ore to metallic sponge iron and to carbonize the sponge iron with an increased carbon content of above 5% prior to discharging the sponge iron to the melter gasifier for further processing.

24. The method of claim 23 further characterized in that said reduction gas is mixed with steam in the melter gasifier prior to being removed from said melter gasifier to form a combined reducing gas.

25. The method of claim 23 further characterized in that said reduction gas is mixed with $CO_2$ in the melter gasifier prior to being removed from said melter gasifier to form a combined reducing gas having an increased CO content.

26. The method of claim 23 further characterized in that a coolant selected from the group consisting of steam, air, nitrogen, $CO_2$, low grade coal and low grade carbonaceous fuel is added to the melter gasifier to control the dome temperature of the melter gasifier to about 1100° C.

27. The method of claim 24 further characterized in that the temperature of said combined reducing gas leaving the melter gasifier is about 1100° C.

28. The method of claim 27 further characterized in that said combined reducing gas is mixed with a stream of cool reduction gas to form a mixed gas having a temperature of about 850° C. and flowing said mixed gas to a reduction furnace.

29. The method of claim 25 further characterized in that the temperature of said combined reducing gas leaving the melter gasifier is about 1100° C.

30. The method of claim 29 further characterized in that said combined reducing gas is mixed with a stream of cool reduction gas to form a mixed gas having a temperature of about 850° C. and flowing said mixed gas to a reduction furnace.

31. A method of refining crude oil and producing molten iron in an environmentally desirable manner comprising:
forming petroleum products from crude oil in a refinery utilizing a delayed coke processing plant, said delayed coke processing plant producing a sponge petroleum coke residual including sulfur and heavy metal components;
introducing the sponge petroleum coke into a melter gasifier;
blowing oxygen containing gas into said melter gasifier and combusting the sponge petroleum coke to form at least a first fluidized bed of coke particles from said petroleum coke;
introducing ferrous material into said melter gasifier through an entry port in the upper portion thereof;
reacting the sponge petroleum coke, oxygen and ferrous material in said melter gasifier to combust the major portion of said petroleum coke to produce reduction gas and molten iron containing heavy metals freed from combustion of the petroleum coke and a slag containing sulfur freed from combustion of the petroleum coke;
flowing reduction gas out of said melter gasifier; and
disposing of the sulfur-containing slag, said slag having a volume substantially less than slag produced when coal is utilized as a fuel.

32. A method as recited in claim 31 wherein said petroleum coke is introduced without coal.

33. A method as recited in claim 31 wherein said reduction gas has a CO level of about 85%.

34. The method as recited in claim 31 wherein said direct reduced iron contains carbon of more than about 5%.

35. A method of refining crude oil and producing molten iron in an environmentally desirable manner comprising:
forming petroleum products from crude oil in a refinery utilizing a delayed coke processing plant, said delayed coke processing plant producing a petroleum coke residual including sulfur and heavy metal components;
introducing the petroleum coke into a melter gasifier;
blowing oxygen containing gas into said melter gasifier and combusting the petroleum coke to form at least a first fluidized bed of coke particles from said petroleum coke;
reducing ferrous material in a reduction furnace to produce sponge iron;
introducing sponge iron into said melter gasifier through an entry port in the upper portion thereof;
reacting the petroleum coke, oxygen and sponge iron in said melter gasifier to combust the major portion of said petroleum coke to produce reduction gas and molten iron containing heavy metals freed from combustion of the petroleum coke and a slag containing sulfur freed from combustion of the petroleum coke;
flowing reduction gas out of said melter gasifier; and
disposing of the sulfur-containing slag, said slag having a volume substantially less than slag produced when coal is utilized as a fuel.

36. A method as recited in claim 35 wherein said petroleum coke is introduced without coal.

37. A method as recited in claim 35 wherein said reduction gas has a CO level of about 85%.

38. The method of claim 35 further characterized in that limestone is added to said reduction furnace in an amount so that the lime exceeds the stoichiometric amount of silica present in the process by at least 1.2.

39. The method of claim 35 further characterized in that bauxite, shale or clay are added to the reduction furnace in an effective amount to produce calcium aluminate slag.

* * * * *